United States Patent [19]
Vannucci

[11] Patent Number: 5,513,184
[45] Date of Patent: Apr. 30, 1996

[54] WIRELESS COMMUNICATION SYSTEM

[75] Inventor: Giovanni Vannucci, Middletown, N.J.

[73] Assignee: AT&T Corp., Murray Hill, N.J.

[21] Appl. No.: 92,379

[22] Filed: Jul. 15, 1993

Related U.S. Application Data

[63] Continuation of Ser. No. 662,532, Feb. 28, 1991, abandoned.

[51] Int. Cl.$^6$ ........................................... H03L 7/08
[52] U.S. Cl. ........................ 370/105.3; 375/376; 331/25
[58] Field of Search ............................ 370/100.1, 105.3; 375/118, 119, 120, 371, 373, 375, 376; 331/25, DIG. 2, 172, 173

[56] References Cited

U.S. PATENT DOCUMENTS

| | | | |
|---|---|---|---|
| 4,807,222 | 2/1989 | Amitay | 370/94.1 |
| 4,825,437 | 4/1989 | Balech | 375/120 |
| 4,847,876 | 7/1989 | Baumbach et al. | 375/120 |
| 4,939,790 | 7/1990 | Sgrignoli | 370/94.1 |
| 4,953,185 | 8/1990 | Goode | 375/120 |
| 4,980,899 | 12/1990 | Troost et al. | 375/120 |
| 5,046,066 | 9/1991 | Messenger | 370/95.2 |

FOREIGN PATENT DOCUMENTS

| | | | |
|---|---|---|---|
| 62-130053 | 6/1987 | Japan | H04M 3/42 |
| 63-14598 | 1/1988 | Japan | H04Q 7/04 |
| 63-26129 | 2/1988 | Japan | H04B 7/26 |

OTHER PUBLICATIONS

39th IEEE Veh. Tech. Fonf., San Francisco, CA, (May 1988) pp. 186–191 "Properties of a TDMA Pico Cellular Office Communication System" D. Åkerberg.

*Primary Examiner*—Wellington Chin
*Attorney, Agent, or Firm*—S. R. Williamson; J. J. Trainor

[57] ABSTRACT

The present invention overcomes the prior art limitations by dividing a coverage area into very small regions or cells. The inventive system can be built as an adjunct to a wired telecommunication system such as a PBX. Advantageously, because of the relatively small size of each cell, transceivers in the inventive system can use very low transmission power, compared with a pico-cellular communications system, to communicate with a fixed transceiver. In addition, because of the relatively short distance between the mobile handset and the fixed transceiver, the communication paths between any two transceivers are reduced and, therefore, the multipath distortion which can affect the received signals is substantially reduced.

A concomitant problem normally associated with relatively small cells is the need for a switching system which can accommodate the large amount of switching or handovers required to accommodate the various mobile units as they move from one cell to another. In accordance with the present invention, this problem is solved by a switching technique which is not centralized in the PBX but, rather, is effectively distributed among the individual fixed-call terminals.

7 Claims, 5 Drawing Sheets

WIRELESS COMMUNICATION SYSTEM

This application is a continuation of application Ser. No. 07/662532, filed on Feb. 28, 1991, now abandoned.

TECHNICAL FIELD

This invention relates generally to a telecommunication system and more particularly to a wired telecommunication system that can establish a communication path between a selected wired communication path and a cordless telephone.

BACKGROUND OF THE INVENTION

A wired telecommunication system such as, for example, a Private Branch Exchange (PBX) has attracted widespread use for business communications because of its flexibility of allowing one to design specific services in accordance with one's business needs. Nevertheless, the equipment with which the PBX users communicate are traditional telephones which are hardwired to the PBX switch. This undesirably limits the mobility of the user who is tethered by the cord connecting the handset of a telephone to its fixed base-unit. Although the traditional telephones can be replaced with cordless telephones to increase the mobility, this replacement, however, does not provide a desirable solution because the portable handset of a cordless telephone must interact with the fixed base unit associated therewith. This being so, as the distance between the portable handset and the base unit increases, the signals to and from the handset are accordingly attenuated. In addition, significant interference is caused by the signals from other cordless telephones which are also connected to the PBX switch. As such, the mobility gained by using a cordless telephone is not only limited, but also results in a compromise of signal quality.

Attempts have been made to solve the above-identified problems. One such attempt involves the use of a pico-cellular communications system such as described in the publication by D. Åkerberg, "Properties of a TDMA Pico Cellular Office Communication system," IEEE ICC 1989, pages 186–191. In such a system, fixed base units are connected to a centralized system manager to provide a transceiving function for the various different pico-cell sites. The system users are supplied with portable handsets which can interact with any one of the fixed base units. As a mobile handset moves from a pico-cell site of a first base unit to another pico-cell site of a second base unit, the provision of the transceiving function is switched from the first to the second base unit under the control of a system manager. Although this switching scheme is intended to solve the signal attenuation problem, it does, however, still require relative high transmission power. The fact that the transmitted signals contain relatively high power may preclude such system from operating in certain radio-frequency bands. Moreover, although this system manages to eliminate the above-noted interference by using a time-division-multiple-access (TDMA) scheme (i.e., each portable handset can only transmit and receive signals during its preassigned time slots), the received signals in this system are corrupted by another type of degradation, namely, multipath distortion. Such distortion occurs when various mutually delayed version of the signal travel along various paths of different lengths. Furthermore, to achieve a significant capacity a substantial spectrum allocation may be required.

Accordingly, a need exists for a wireless telecommunication system which does not have the above noted defects.

SUMMARY OF THE INVENTION

The present invention overcomes the prior art limitations by dividing the coverage area into regions, hereinafter referred to as "femto-cells", that are smaller than pico-cells. The inventive system can be built as an adjunct to a wired telecommunication system such as a PBX. Advantageously, because of the relatively small size of a femto-cell, transceivers in the inventive system can use very low transmission power, compared with the pico-cellular communications system, to communicate with the fixed transceiver. In addition, because of the relatively short distance between the mobile handset and the fixed transceiver, the communication paths between any two transceivers are reduced and, therefore, the multipath distortion which can affect the received signals is substantially reduced.

A concomitant problem normally associated with relatively small cells is the need for a switching system which can accommodate the large amount of switching or handovers required to accommodate the various mobile units as they move from one cell to another. In accordance with the present invention, this problem is solved by a switching technique which is not centralized in the PBX but, rather, is effectively distributed among the individual fixed-cell terminals.

DETAILED DESCRIPTION

Figure 1:
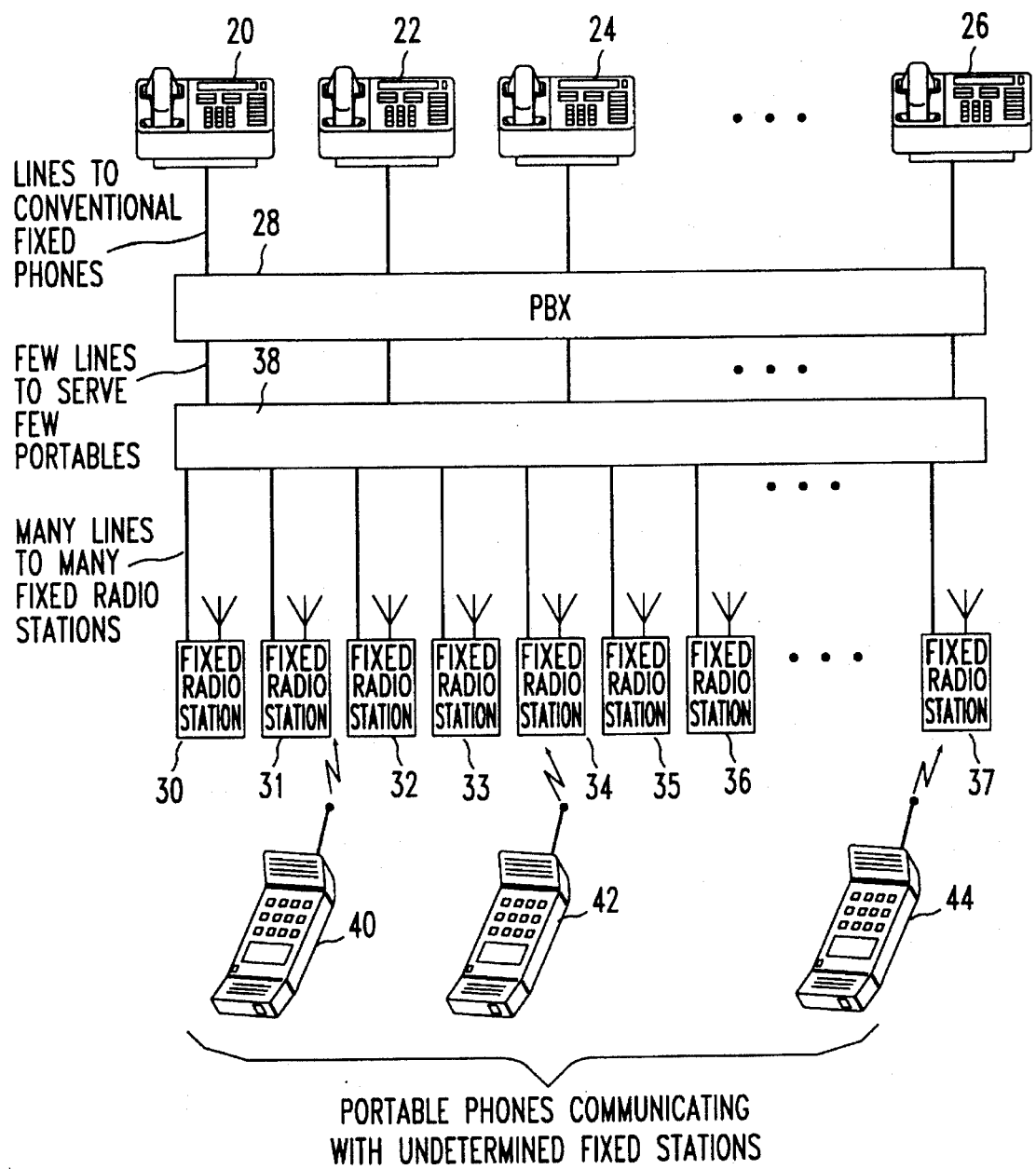
FIG. 1 is a block diagram of a Time-Division Duplex digital system in accordance with the principles of the invention.

In this invention, a wired telecommunication system such as, for example, a Private Branch Exchange (PBX) is now provided with a wireless capability. More specifically, a PBX is provided with wireless/portable access to permit a user to roam freely over the area served by the wired PBX system. The system uses existing redundant wiring available in a typical PBX installation to subdivide the covered area into a number of small cells, typically, one cell per room. Radio and switching techniques for this system can result in several benefits such as: A) Low initial cost for a system with limited coverage/capabilities, with expansion costs being proportional to the capability being added; B) Simple, FM-based radio interface which is not impaired by multipath propagation and, through extensive frequency reuse, providing good system capacity at low cost; and, C) Low power operation that allows the use of the ISM band (902–928MHz) under Part 15 of the FCC rules without spread-spectrum techniques and with low risk of interference to or from the system.

The concept is based on a so-called "femtocellular" architecture. The prefix "femto" is the next one down after "pico" and is used to emphasize the fact that the coverage area is subdivided into cells that are even smaller than those for so-called "pico cellular" systems as proposed in the publication by D. Åkerberg entitled "Properties of a TDMA Pico Cellular Office Communication System,"39th IEEE Veh. Tech. Conf., San Francisco, Calif. (May 1988) pp. 186–191. Typically, in this invention, there are one or more cells per room, and the interconnections among the various cell sites and the central PBX switch are accomplished through existing PBX wiring.

In this system, the covered area is subdivided into very small cells, even smaller than those proposed for so-called "picocellular" systems. Thus, the system here disclosed is referred to as a "femtocellular" system. Many existing PBX's have redundant wiring in the walls; typically, there are redundant jacks in each room, and each jack carries four wire pairs, of which only two are used by most terminals. Additionally, these wires can easily support a bit rate of 1–2 Mbit/s. While this may not be very much as an aggregate bit rate, a femtocellular architecture would allow this bit rate to be re-used many times over the area covered and thus allow the wireless adjunct to provide the required capacity. Indeed, since PBX wiring is available in essentially every room, a cell can typically be a single room. Because signal propagation from room to room is not very good in the average building, the full spectrum can be reused in rooms which are only a few rooms away.

Many important advantages are brought about by the use of such small cells. One is the ability to re-use the spectrum many times, as noted above. A second advantage is the elimination of multipath impairment. Multipath impairment increases substantially as the distance between transmitter and receiver increases. While there is great variability of signal transmission characteristics from site to site, depending on construction materials, building design, and the like, for systems which operate at 1–2 Mbit/s impairment becomes significant at distances which are greater than a hundred feet. In the femtocellular system here disclosed, distances are typically substantially less than a hundred feet, and, therefore, the multipath impairment can be ignored. It is here noted that picocellular systems described by D. Åkerberg in his article identified above include no provisions for multipath protection (such as equalization) even though their operating distances are much closer to the range where it can become a problem. Clearly, the femtocellular concept here disclosed includes a comfortable safety margin.

A third advantage of the short distances is the very low radio-frequency (RF) power required for communication. In addition to the obvious benefits of lower cost and reduced power-supply demand, this has important beneficial regulatory implications. Specifically, the fact that there is no spectrum allocated by the Federal Communication Commission (FCC) for this type of service, leaves the Industry, Science and Medical (ISM) band as the only possibility for a digital wireless PBX to be deployed in the near future. It is here noted that the ISM band ( 902–928MHz) has been opened recently for unlicensed use under Part 15 of the FCC regulations. Use of this band would normally carry the requirement that spread-spectrum techniques be used, except if the transmitted RF field can be kept below a certain limit that corresponds to about ½ mW of transmitted power. This is quite adequate to support 1–2 Mbit/s at the short distances of the femtocellular architecture, so that this invention can operate in this band without the complication of having to use spread spectrum.

A fourth advantage of the small distances is the short propagation delays. At the speed of light, which is approximately 1 ft/ns, the round-trip delay of the radio signal is always a small fraction of the bit period (which is 500 ns at 2 Mbit/s). Thus, in this invention the system can be completely synchronous, where the same clock is used for both the forward and reverse links (downlink and uplink). Referring to FIG. 1, there is illustrated structure in accordance with the principles of the invention. It is to be noted that the disclosed system is different from the typical mobile-radio environment, where it is usually desirable to put sophisticated hardware in the fixed station, (which is shared among many mobiles) if it leads to a simplification in the mobile/handset design. In this invention, the intelligence can be in the handset and the PBX to allow for simplification of the task of the fixed radio units.

The very low RF power requirement of ½ mW means that if the fixed-radio unit can be kept at a comparably low power-supply requirement, i.e., less than 1 W it may be possible to power the whole unit through the same PBX wire used for communication. This will eliminate the need for an AC power hookup to the fixed units.

Important features that this wireless telecommunication system offers include: a) Roaming, i.e., the ability for each portable to place and receive calls anywhere in the coverage area without requiring any special action; b) The ability to have multiple, simultaneously active users in the same room, their number being limited by the total capacity available in one frequency re-use; and c) Immunity to interference from similar systems located in the vicinity.

The short distances of the inventive femtocellular architecture are very helpful, when it comes to interference, in two ways: a) The interference caused to other systems is small because of the low transmitted power levels used; and b) The received power levels will be high, despite the low transmitted levels, and they will provide a good margin against a possible interference background.

The embodiment of the invention disclosed in FIG. 1 is a Time-Division Duplex (TDD) digital system. It is to be understood, however, that the system can be a Frequency Division Duplex (FDD) digital system. Specifically, three important advantages of TDD are: a) Elimination of the need for the costly RF filtering required by frequency duplexing. b) The same propagation medium, at the same RF frequency is used, in both directions. (This provides channel reciprocity which, in this system, is exploited as follows: At any given time, the system picks a specific fixed ratio station to communicate with a given portable. The choice is made in such a way as to optimize the quality of the uplink channel. Because of reciprocity, the choice will also be optimal for the downlink channel); and, c) With TDD, transmission and reception occur at different times. Thus, it is possible for some RF hardware to be used for both purposes, leading to a reduction of component count. Theoretically, frequency modulation (FM) requires more bandwidth and has higher Signal-to-Noise Ratio (SNR) than, for example, two-level Phase Shift Keying. However, it has the advantage that it is very simple and economical.

The modulator can be a Voltage Controlled Oscillator (VCO) that puts out enough power to go directly into the antenna without an RF amplifier. The demodulator can be the Motorola MC13055 which is a low-cost integrated circuit that can handle bit rates up to 2 Mbit/sec. It includes a limiting IF amplifier with a dynamic range better than 60 dB and a limiting sensitivity of about –60 dBm.

Referring to FIG. 1, a wireless telecommunication system such as a PBX can include a plurality of station sets 20, 22, 24, 26 coupled to a PBX switching center 28 via communication paths such as copper wires. A plurality of fixed radio stations 30, 31, 32, 33, 34, 35, 36, 37 are coupled via other communication paths such as copper wires to the switching center 28 through a digital router 38 . Portable phones, typically 40, 42, 44 are adapted to communicate collectively, via radio, to the fixed radio stations 30–37.

Figure 2:
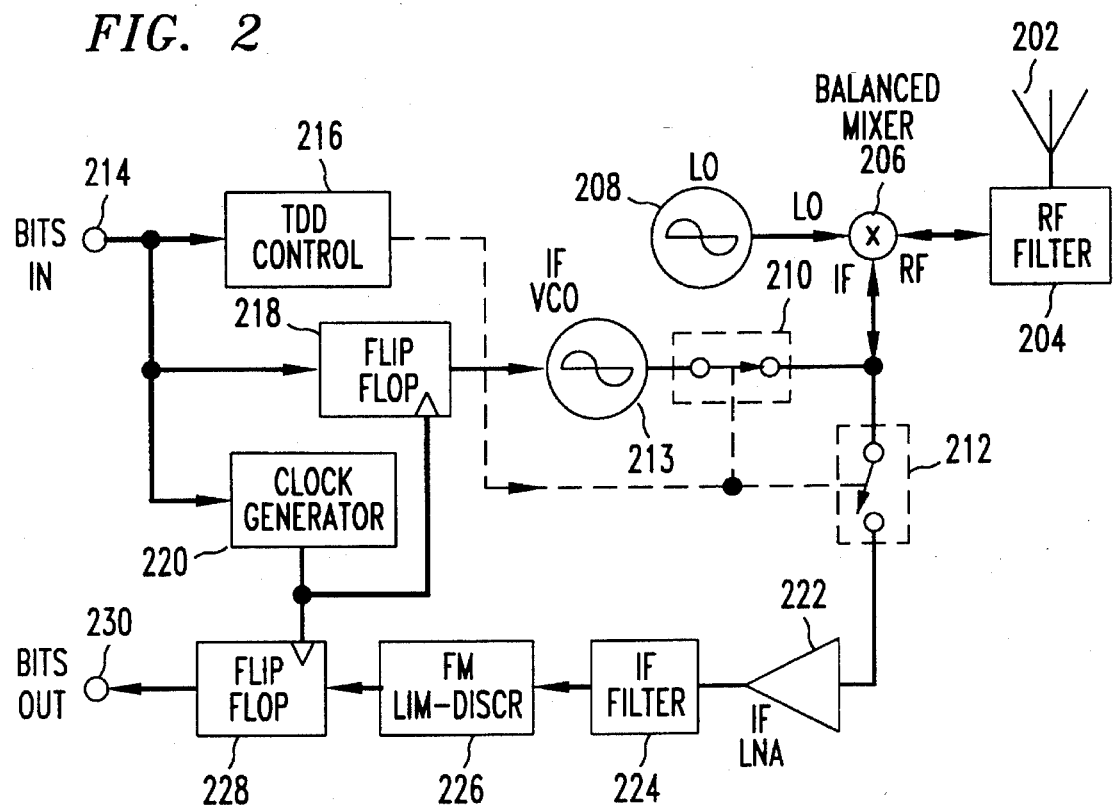
FIG. 2 is a block diagram of the fixed radio station of FIG. 1.

Referring to FIG. 2, there is illustrated a block diagram of the fixed radio stations 30–37 of FIG. 1. Of the two halves of the radio link, the portable phone 42–44 and the fixed radio stations 30–37, the fixed radio station is the more challenging because of the constraints discussed in the previous Section. However, very similar goals (low power, low cost, small volume, etc.) also apply to the portable unit, so that many of the same solutions are useful for both.

Referring to FIG. 2, the circuit can comprise four RF components: The antenna 202, the RF filter 204, the balanced mixer 206 and the fixed-frequency local oscillator (LO) 208. All four components are used in both transmission and reception by taking advantage of the bidirectional capability of the balanced mixer 206. It is to be noted that the balanced mixer is assumed to be a passive mixer.

A bit in port 214 is coupled to an input port of TDD control 216, an input port of a flip flop 218, and an input port of a clock generator 220. An output port of the TDD control 216 is coupled to switches 210 and 212. Output port of flip flop 218 is coupled to the input port of IF VCO. Switch 212 is coupled to feed a signal through an IF LNA 222, an IF filter 224, an FM LIM-DISCR 226, and a flip flop 228 to an output port 230. The output port of clock generator 220 is coupled to flip flop 218 and flip flop 228.

The principle of operation of the structure of FIG. 2 is as follows: During reception, switch 210 is opened and switch 212 is closed, so that a standard heterodyne receiver is provided. Because there is no RF preamplifier, the noise figure of the receiver will be reduced by the insertion losses of the mixer and RF filter. During transmission, switch 212 is opened, switch 210 is closed and the IF VCO, which produces a signal with the desired 2-FSK modulation centered about the receiver's IF frequency is activated. This signal is inserted into the mixer's IF port. Because the balanced mixer is bidirectional, this signal will be mixed with the LO signal from 208 and the RF port of mixer 206 will produce a version of the 2FSK signal upconverted to the desired RF frequency. It will be accompanied by an unwanted mixing product, as well as by the residual unsuppressed LO signal, both of which are eliminated by the RF filter 204.

The rest of the block diagram is relatively straightforward. Although the ports 214, 230 for bits in and bits out are shown as being separate, the architecture insures that they will not be used at the same time; and the two ports can be connected via an interface to a single wire pair. The only supervisory signal required from the switching center 28 of FIG. 1 is the "TDD control," which puts the unit in either the transmit or receive mode. This signal, the information bits, the bit clock etc., can be transmitted over the wire pair by any one of the many known ways.

The absence of a clock-recovery box for the received signal is to be noted. This is because the system takes advantage of the very short distance between the fixed radio station unit and the portable phone, which renders the radio propagation delay negligible. It is assumed that, in the portable phone unit, the bit clock is recovered from the received bits using a Phase-Lock Loop (PLL). The PLL is sufficiently stable that it can maintain the correct phase for a period of time, even in the absence of an input signal. Because of this it can "flywheel" over the portion of the TDD frame where no signal is received. In this manner, the recovered clock is available in the portable unit during the entire TDD frame and can be used during transmission to generate the transmitted bits.

Figure 5:
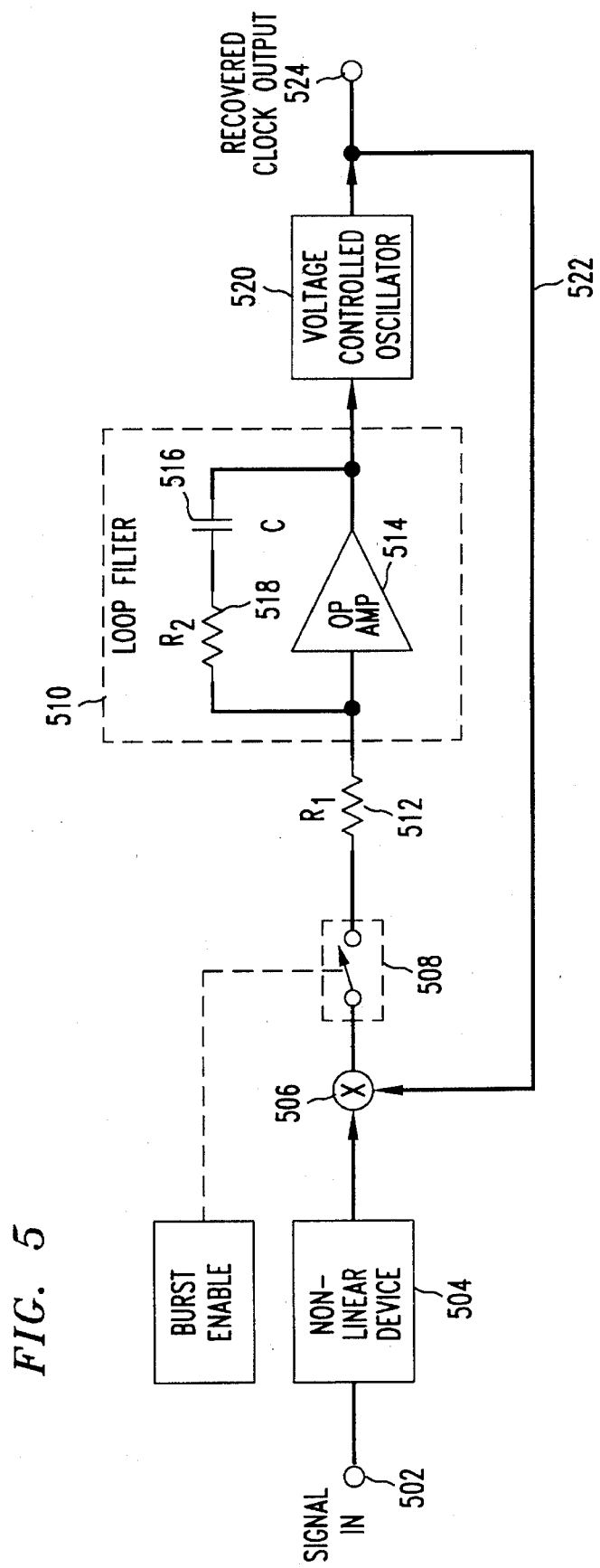
FIG. 5 is a block diagram of a circuit for recovering a clock pulse from a burst signal.

Referring to FIG. 5, there is illustrated a block diagram of a circuit for recovering a clock pulse signal from a burst signal. The burst input signal is applied via an input terminal 502 to a nonlinear device 504 such as a diode or the like. The output of the nonlinear device is fed to an input port of a multiplier 506. The output of the multiplier is coupled, through a switch 508 to the input port of a loop filter 510. The loop filter can comprise an input impedance 5–12 to an operational amplifier 514 in combination with a feedback loop of a capacitor 516 in series with an impedance 518. The output of the loop filter is coupled to the input port of a voltage controlled oscillator 520. A feedback loop 522 couples the ouput of the voltage controlled oscillator to a second input port of the multiplier 506. The switch 508 is selectively opened and closed by the burst signal. The recovered clock pulse signal appears at output port 524.

In operation, at the end of a burst the state of the circuit of FIG. 5, which can be considered to be a second order phase locked loop (PLL), is "frozen" with the oscillator 520 running freely. If the short-term stability of the oscillator is sufficiently good, the phase error accumulated while the oscillator "flywheels" between bursts will be small. In the fixed radio station unit, the clock signal comes through the wire pair. Whether it is recovered from the digital signal or obtained by some other means, it is available during the entire TDD frame thus permitting the clock to be used for both the transmitted bits and for latching the received bits that come through the fixed radio station. In FIG. 2, the RF filter 204, in addition to providing the usual function of limiting interference, helps meet the FCC's out-of-band emission constraints. Specifically, the FCC requires all emissions outside of the ISM band to be attenuated by at least 48 dB with respect to the transmitted signal of ½ mW. In this invention, out-of-band emissions can be caused by the LO signal that leaks through the mixer during both transmission and reception, as well as by the unwanted mixing product during transmission. Both of these can be attenuated by the RF filter down to a level that meets FCC requirements.

If an IF frequency of 40 MHz, is selected, as is recommended in the application notes for the MC 13055, then a two- or three-pole RF filter meets the requirements. With this choice for the IF frequency, the IF filter is realizable with lumped components.

The large number of small cells here disclosed means that handover can be a common occurrence in this system. There are two requirements: a) Handovers have to be seamless; i.e., invisible to the user; and b) Handover control has to be distributed and require little overhead to prevent the system from becoming overwhelmed by the large volume of such events.

Following is a digital-routing architecture that meets these requirements. To simplify the description, a system without frequency re-use will be considered first.

Figure 3:
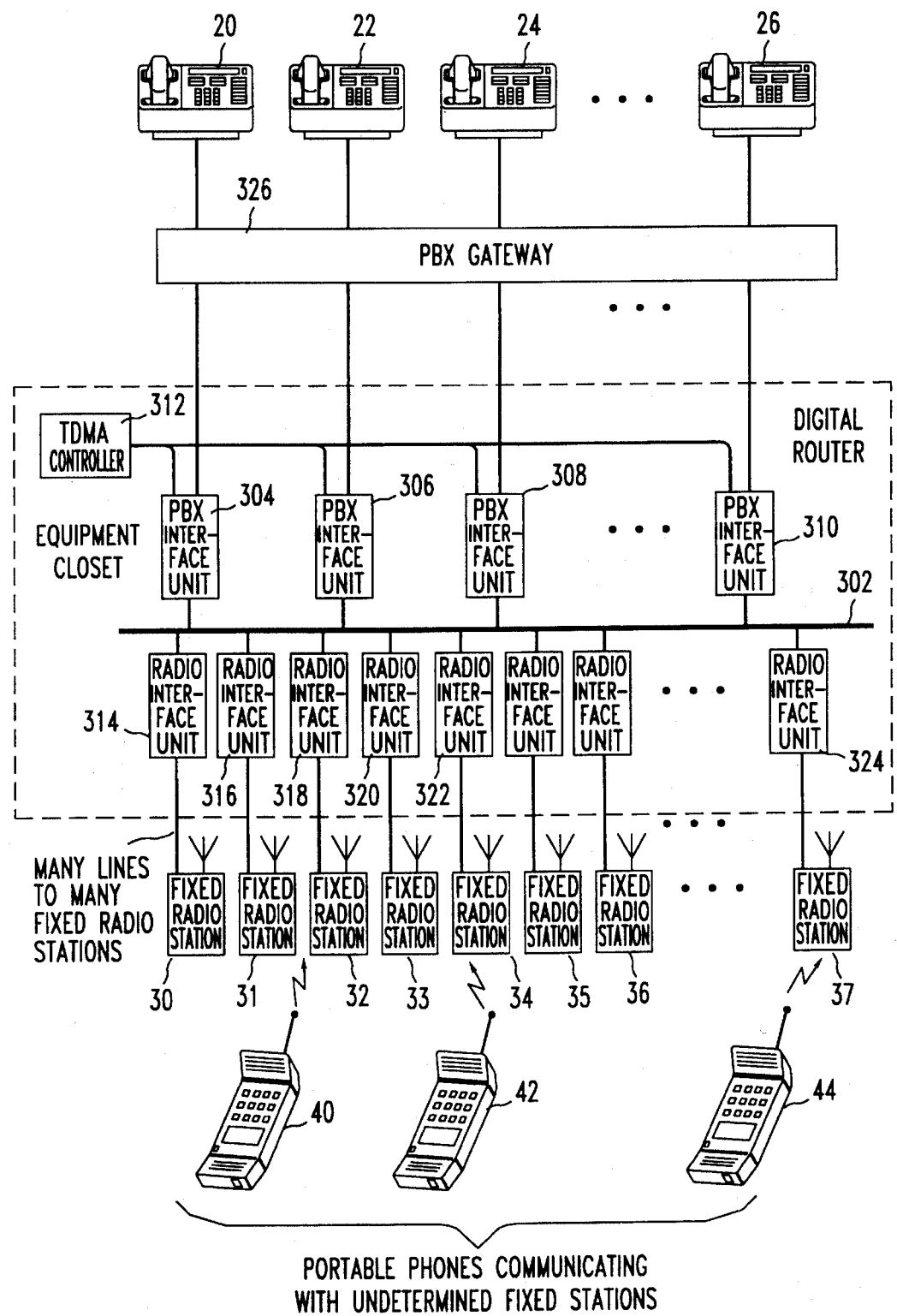
FIG. 3 is a block diagram of FIG. 1 including structure of the digital router.

Referring to FIG. 3, there is illustrated the structure of FIG. 1 plus the structure of the "DIGITAL ROUTER" box. The digital router can include a synchronous bus 302. PBX interface units 304, 306, 308, 310 interconnect the synchronous bus 302 with discrete communication paths to the PBX switching center 28. A Time Division Multiple Access (TDMA) controller 312 is coupled to each interface unit 304–310. A synchronous bus is also coupled to each fixed radio station 30–37 via a radio interface unit 314, 316, 318, 320, 322, 324. The wire pairs coming from the fixed stations 30–37 are interconnected via a synchronous bus 302. The bus can include a single data line that is shared among the various fixed radio station according to the same TDD frame that is implemented on the airwaves. The same clock is used for both. For the downlink, the radio interface units 314–324 take bits from the bus and put them on the wire pairs, without any processing or storage. The reverse occurs for the uplink. Any processing, translation, etc. that is required is performed in the PBX interface units 304–310 and/or in PBX gateway 326 interposed between the PBX interface units and the PBX switching center 28.

In practice, the signal delay over the wire pairs is not negligible. It is, however, small. In most PBX installations the cable length between a jack and the equipment closet which contains the digital router and the PBX switching center is normally limited to a maximum of 100 meters. This corresponds to a round-trip delay of less than about 1200 ns which, at a bit rate of 1–2 Mbit/s, corresponds to 2–3 clock cycles. To account for this delay, the uplink portion of the TDD frame on the bus should be delayed, compared to the radio TDD frame, by an amount equal to the maximum possible cable delay. Each radio interface unit can include an adjustable digital delay, which can be set at installation time, to insure that the round-trip delay is the same for all units, regardless of differences in cable lengths.

Figure 4:
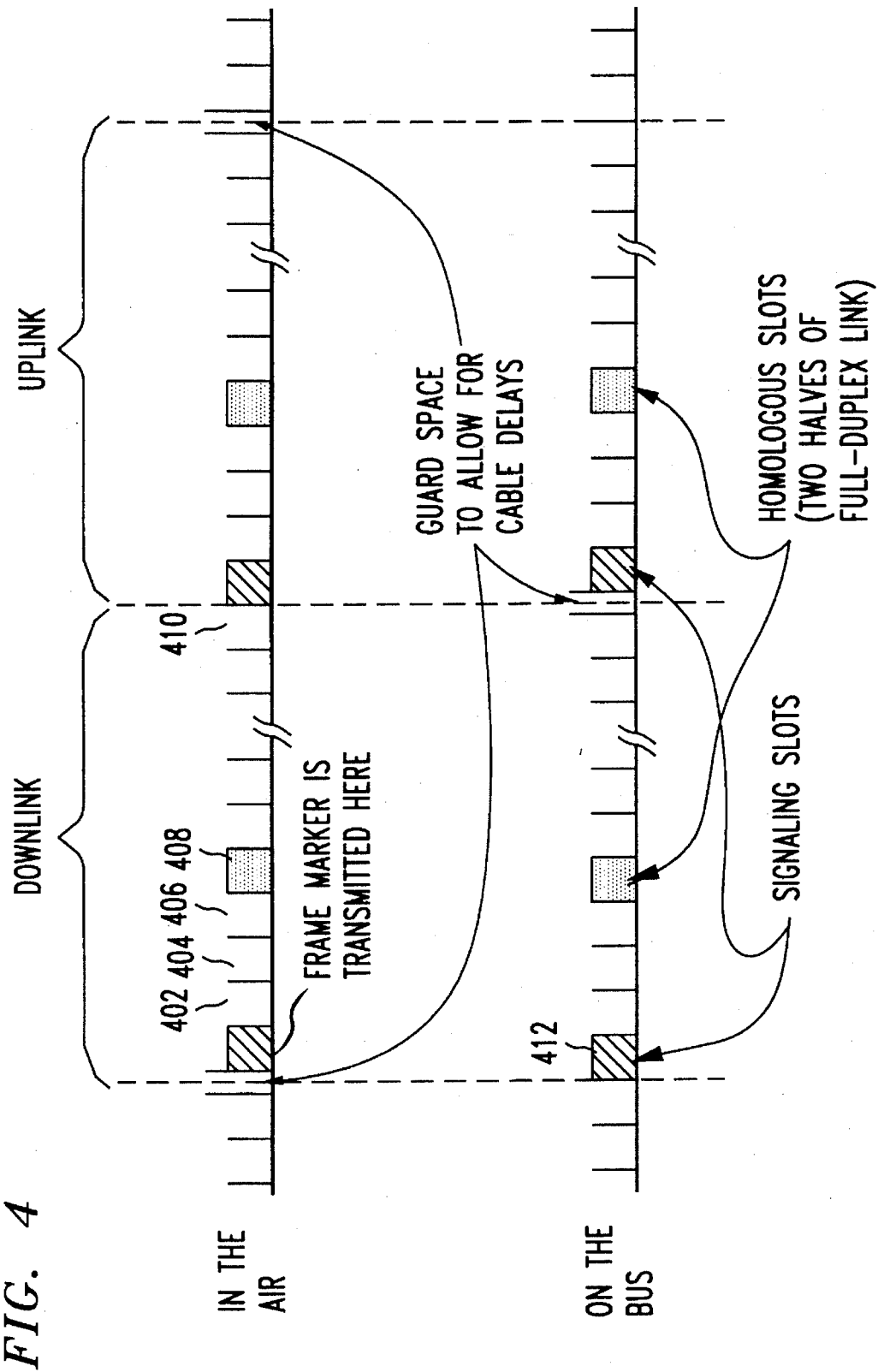
FIG. 4 is an illustration of Time-Division Duplex flames.

Referring to FIG. 4, there is illustrated a diagram of the Time Division Duplex (TDD) frames. The only difference between the upper (in the air) and the lower (on the bus) is the position of the guard space, whose size must be equal to the maximum cable round trip. Details such as the bit rate, the number of slots, etc. depend on the specifics of the system implementation. For example, if a transmission bit rate of 1.544 Mbit/s and a voice data rate of 32 Kbit/s, is chosen, then about 20–22 slot positions are needed in each half of the TDD frame, where the exact number depends on the amount of overhead allowed for error protection, guard time between slots, etc. It has been determined that about 20–22 slot positions will support about twenty simultaneously active wireless users.

Because the entire system is synchronous, no burst preamble is needed and the guard time between bursts can be as little as one clock cycle -just enough for the RF output of one transmitter to die down and that of the next transmitter to reach full power. With such a low frame overhead, the frame rate can be kept relatively high without significant penalty, which is usually desirable. However, the selection of specific frame parameters will, in general, have to also take into account non-technical factors. For example, it may be desirable to consider the advantages (or lack thereof) of having some compatibility with the Digital European Cordless Telecommunications (DECT) standard.

Each half of the TDD frame contains two different types of slots, namely, regular communication slots 402, 404, 406, 408, 410 and signaling slots 412. The downlink signaling slots contain the signaling bursts coming from the system controller, which perform two important functions: a) They provide the downlink signaling channel from the controller to the portable units; and b) they provide the frame marker, which the portable units use to synchronize themselves to the TDD frame. Unlike the regular downlink bursts, the signaling bursts are transmitted by all the fixed radio units simultaneously; this insures that all portable phones (portables) receive the bursts regardless of where they are. The clock- and frame-recovery circuits in the portables should be designed to work properly when the only received bursts are the signaling bursts. Thus, it may be desirable to have two signaling slots, one at the beginning and one at the end of the downlink half of the TDD frame.

The uplink portion of the frame have the counterparts of the regular and signaling slots. Because there are many radio interface units 314–324 that can put data on the bus, a bus-contention scheme is needed to insure that, in a given time slot, only one unit has control of the bus. This unit should be the one whose corresponding base station has the best radio path to the portable phone that is transmitting in that particular time slot. The uplink and downlink signaling channels are used during call set-up whether initiated by the PBX or by the portable phone unit.

Following is a description of how to select which radio interface unit should take control of the bus during each uplink slot. The principle of operation is as follows: Each received burst includes parity bits or, more generally, forward error correction that can be used to establish the quality (number of bit errors) of the received signal. Each radio interface unit monitors the number of errors which occur in each slot. If no portable phone unit is transmitting in the vicinity of the corresponding fixed station, a large number of errors will occur. Conversely, in a slot where a portable phone unit is transmitting, some of the radio interface units will register a small number of errors; those connected to stations that are closer to the portable will register fewer errors than those further away. All the units contend for the bus, and the one with the fewest number of errors is given control of the bus.

The details of how the contention can be resolved are as follows: The bus can include a few lines (for example, four lines) dedicated to contention resolution. Each of these lines is driven concurrently by all of the radio interface units in such a way that if any one of the units pulls the voltage down, the voltage will stay down. It will be up only if none of the units pull it down. At each burst, each unit pulls down a number of lines determined by the number of errors observed: With no errors, all four lines are pulled down; with a large number of errors no lines are pulled down; for an intermediate number of errors an intermediate number of lines are pulled down, in the style of a "thermometer" display. Each unit monitors how many lines actually go down; if more lines go down than the unit itself pulled down, it means that there is some other unit on the bus that has a better signal burst. If the number of lines that go down is the same as the number that the unit pulled down, it means that it has the best available signal burst, although there may be others that have an equally good signal. One of these radio interface units will take control of the bus. Since it doesn't make any difference which one it is, this ambiguity can be resolved through a priority convention, e.g. the leftmost such unit grabs the bus.

The above procedure solves the problem of the uplink. For the downlink the problem of bus contention does not exist, however, the unit that has the best radio path is still desired to transmit the burst. This can be accomplished as follows: When a radio interface unit grabs the bus during an uplink slot, it remembers the slot position. When the corresponding (homologous) downlink slot comes along, that unit will also have the best downlink path, thanks to the path reciprocity in TDD systems, and therefore it is the one that transmits the data. In the simplest implementation, the homologous slot may just be the slot that is in the same position in the downlink half of the TDD frame. If, for some reason, independent selection of uplink and downlink slots is required, a mechanism for the Time-Division Multiple Access (TDMA) controller to inform the radio interface units of how the slots are paired can be provided.

This scheme provides both distributed handover and a form of antenna diversity. That is, a portable unit will usually be within range of a handful of fixed stations. As the multipath environment changes and the path to the fixed station being used becomes bad, the radio link will automatically switch over to a different station with a better path. The goal of a distributed, seamless handover is thus achieved in a way that is perfectly transparent to the TDMA controller, the PBX and the PBX interface units. All they have to do is put the bits on the bus at the right time and collect the return bits in the homologous slot; they do not have to know where the portable unit is or how it is moving. On the other side, the fixed stations do not have to know which portable unit they are communicating with in each slot, they only have to know the positions of the homologous slots. This is reflected in FIG. 3 by the absence of connections from the TDMA controller 312 to the radio interface units 314–324.

In the procedure just described, it is to be noted that there may not be enough bits in a single burst to obtain an accurate measure of the bit-error rate (BER). In addition, it may be necessary to store each burst in order to measure the number of parity violations prior to putting the burst on the bus. It is an advantage, however, to be able to put the bits on the bus as they come through the wire pair without requiring storage. Both problems can be solved by having the radio interface units contend for the bus, and decide which unit grabs the bus prior to the arrival of a burst. The decision can be based on the number of errors that have occurred in the past in each uplink slot position. A sliding interval or a decaying average, with a time duration long enough to include a good number of bit errors but short enough that the multipath environment does not change too much over the measurement interval (e.g. 100 ms) can be used. This way, during each time slot, the units can contend for bus control in the following time slot and be ready when the next burst arrives.

A basic femtocellular wireless telecommunication system is described above. To this basic system, it may be desirable to add the two additional features of frequency re-use and dynamic slot assignment.

The single-bus architecture discussed above can be an obstacle to adding frequency re-use because, even if the radio medium is re-usable, the bus medium is shared among all fixed stations and cannot be re-used. To fully achieve frequency re-use capability, the same TDD slot should be freely assignable to different portables, provided they are far enough away from one another so as not to cause mutual interference. This would provide maximum flexibility and most efficient use of the available spectrum. While a variety of implementations that achieve such a goal are possible, the system implemented, should be simple and easily expandable.

For example, consider the situation where an initial single-bus system needs additional capacity. The simplest solution consists of subdividing the coverage area into two geographically separate halves (henceforth referred to as "zones") and using two separate buses, one for each half. Each bus can have its own TDMA controller, but the two buses should be synchronized, so that the downlink signaling slots can be the same in both zones and transmit the same data simultaneously. There is no need to coordinate the assignment of communication slots by the two TDMA controllers; indeed, this would be difficult to accomplish since the controllers do not know where the portable units are located and, therefore, have no way of knowing which two may potentially interfere with one another. The dynamic slot assignment technique, discussed below, can insure that there is no interference between zones.

There is the question of what to do about the portable phone that moves from one zone to another while actively communicating because the distributed-handover scheme described above is not designed to work across zone boundaries. The simplest solution is to do nothing at all and require the portable phone to hang up and redial when crossing over. However, for the customer that finds this inconvenient, it may be desirable to provide a centralized "zone-handover manager"; i.e., a circuit that connects to the TDMA controllers for the various zones and implements handovers from one zone to the next when needed. Unlike the handovers described above, this will be an infrequent event and a centralized solution appears reasonable.

Dynamic slot assignment means that the selection of TDD slots for a particular wireless link is made in such a way as to minimize interference, and is updated as needed if the interference level grows beyond acceptable levels. A concrete example will clarify how it can be implemented.

When a portable unit is first turned on, it searches for a frame marker (which is part of the downlink signaling bursts). When one is found, the portable unit will be able to synchronize itself to the TDD frame and begin to decode the signaling information. Later, a request to establish a communication link may come from either the TDMA controller (an incoming call) or the portable phone (an outgoing call). In either case, the portable phone must be able to contact the TDMA controller prior to the establishment of the link, either to request the link itself (for an outgoing call) or to respond to a controller request and signal its presence (for an incoming call). It can do so through the uplink signaling channel but, because other portable phones may be trying to access the uplink signaling channel at the same time, it should use an ALOHA-type protocol. This means that the portable phone unit should re-try to send the data after a random delay if it does not get a receipt acknowledgement in a reasonable time.

Among the information that the controller provides to the portable phone will be a list of available slots to choose from. The portable phone unit can use its receiver to monitor those slots and determine which ones are free from interference. Then, in its uplink signaling communication, it will tell the controller which slot it has selected. Once a link has been established, both the portable and the controller continually monitor the quality (e.g., the bit-error rate) of the link. If it falls below a certain threshold, an attempt is made to move the link to a better slot, i.e., to one with less interference. Should that fail, the controller will conclude that the portable unit is moving out of the zone and take whatever action is appropriate.

Ideally, the selection of the downlink slot should be made by the portable unit, as described above, while the selection of the uplink slot should be made by the TDMA controller on the basis of the amount of interference received by the fixed station closest to the portable unit. This is not practical in this system where the fixed stations send only detected bits over the wire pairs and the controller does not know where each portable unit is located. Therefore, the portable should do the selection for both the uplink and the downlink. In principle, there is the possibility that this might not work correctly: A certain uplink slot may appear to the portable phone unit to be reasonably free of interference, while the fixed station may actually be closer to an interferer and be impaired by it. In practice, the short distances of the femtocellular architecture make this occurrence unlikely. Furthermore, should such a mistake occur, the poor BER over the newly established link would immediately flag the problem and cause a slot reassignment within a fraction of a second.

Note that this technique provides immunity from slot interference that is non-specific in nature; i.e., it is effective not only against adjacent-zone interference, but also against any form of interference that occurs periodically with the same period as the TDD frame. As such, it will be effective at providing immunity against other similar systems in the vicinity. As long as the systems use the same flame period with reasonably accurate master clocks, there may be some slow relative slippage of the respective TDD flames but, essentially, any mutual interference will re-occur periodically in the same time slots for long periods of time.

A part of the description above is directed to how dynamic slot assignment can provide protection against interference from like systems. Unfortunately, this protection only works for the communication slots, which can be re-assigned as needed; it cannot be applied to the signaling slots. In addition, the successful operation of dynamic slot assignment depends on the availability of the signaling channel. Therefore, adequate protection for signaling bursts should be provided.

It is noted that the amount of information that must be exchanged over the signaling channel is very small compared to the available bit rate. This means that simple but powerful error protection techniques can be used to insure good communications, even with a low signal-to-interference ratio (SIR). Also, if the interfering system uses dynamic slot assignment, its communication bursts will automatically avoid our system's signaling bursts. Thus, the worst case occurs if the TDD frames happen to be perfectly aligned; then, the signaling bursts of one system overlap those of the other and, near the boundary between the coverage areas, the portable units will see a very poor SIR in the signaling channel. This is not a big problem for the signaling information itself, as the ALOHA protocol, if implemented appropriately, can easily cope with it. When it comes to the frame markers, however, a sufficiently long bit sequence should be selected to insure reliable synchronization under these adverse conditions.

In the discussion of the subdivision of the coverage area into zones, it was assumed that the separate buses would be mutually synchronized to within a fraction of a clock cycle. This is certainly feasible if the buses are located in the same equipment closet. However, a large PBX installation is likely to have more than one equipment closet and, therefore, the synchronization of buses located in different equipment closets to within fraction of a clock cycle may be difficult. Therefore, the system should be capable of operating with a synchronization uncertainty of several clock cycles.

The absence of synchronization can create a problem near the boundary between regions served by different equipment closets, especially so when it comes to the signaling bursts which must be transmitted by all the fixed stations simultaneously. The simplest solution consists of doing nothing about it. Typically, different equipment closets serve regions that are rather separate from one another, such as different floors of a building. Very simply, a portable unit can be required to hang up and re-dial when moving from floor to floor; but, as before, for those installations that require it, an optional solution can be provided. For example, the separate regions can operate as if they were independent systems, each one with its separate signaling channel, but the limited synchronization available to insure that the signaling slots from adjacent regions do not overlap can be exploited. Dynamic slot assignment will then automatically keep the communication bursts from one region out of the way of the signaling bursts of an adjacent region. Finally, an optional unit to manage the more complicated region-to-region handover can be provided, if desired.

I claim:

1. A communications system comprising
   a transmitter whose transmitting functions are controlled by a first clock signal;
   a receiver whose receiving functions are controlled by a second clock signal;
   clock recovery means connected to said receiver for generating said second clock signal in response to communications coupled from said transmitter, said clock recovery means including an oscillator whose operation is varied in response to said communications;
   said clock recovery means further including means for substantially maintaining this operation at its last varied state in an absence of any communications from said transmitter; and
   said communications between said transmitter and receiver occurring in bursts and said clock recovery means still further including a switching element connected to said oscillator, said switching element being selectively closed during the presence of a burst for coupling said burst to an input port of said oscillator and opened during the absence of said burst for isolating the input port of said oscillator.

2. The communications system of claim 1 wherein said bursts are separated by time intervals in which no communications are coupled.

3. The communications system of claim 1 wherein said transmitter and receiver are respectively parts of non-mobile and mobile receivers.

4. The communications system of claim 1 wherein said oscillator is part of a phase locked loop including a loop filter which maintains said oscillator characteristic at its last adjusted state in absence of said communications.

5. The communications system of claim 1 wherein said loop filter includes an operational amplifier whose input and output terminals are connected via a feedback loop comprising a comprising a capacitor serially connected to an impedance.

6. A method comprising the steps of
   providing a wireless signal in bursts from a first to a second transceiver;
   recovering a clock signal from said wireless signal at said second transceiver by varying a characteristic of an oscillator in response to said wireless signal and substantially maintaining the last varied state of the characteristic in the absence of said wireless signal;
   using the recovered clock signal to control the reception and transmission of communications in said second transceiver; and
   connecting a switching element to said oscillator, said switching element being selectively closed during the presence of a burst for coupling said burst to an input port of said oscillator and opened during the absence of said burst for isolating the input port of said oscillator.

7. A wireless communications system comprising
   a wired communications system having a plurality of communications channels;
   a plurality of non-mobile transceiver, each connected to said wired communications system via a different communications link;

at least one wireless mobile transceiver, each adapted to communicate with each non-mobile radio transceiver;

clock recovery means disposed in each mobile transceiver to recover a clock signal that is used for controlling transmit and receive operations in that mobile transceiver, said clock signal being recovered from wireless signal bursts coupled from said non-mobile transceiver to that mobile transceiver, said clock recovery means including an oscillator whose operation is varied in response to said bursts and means for substantially maintaining the operation of said oscillator in its last adjusted state in the absence of said bursts; and said clock recovery means further including a switching element connected to said oscillator, said switching element being selectively closed during the presence of a burst for coupling said burst to an input port of said oscillator and opened during the absence of said burst for isolating the input port of said oscillator.

* * * * *